Feb. 28, 1950 J. P. TURNER 2,499,174
CATTLE TREATING APPARATUS
Filed Sept. 30, 1944 2 Sheets-Sheet 2
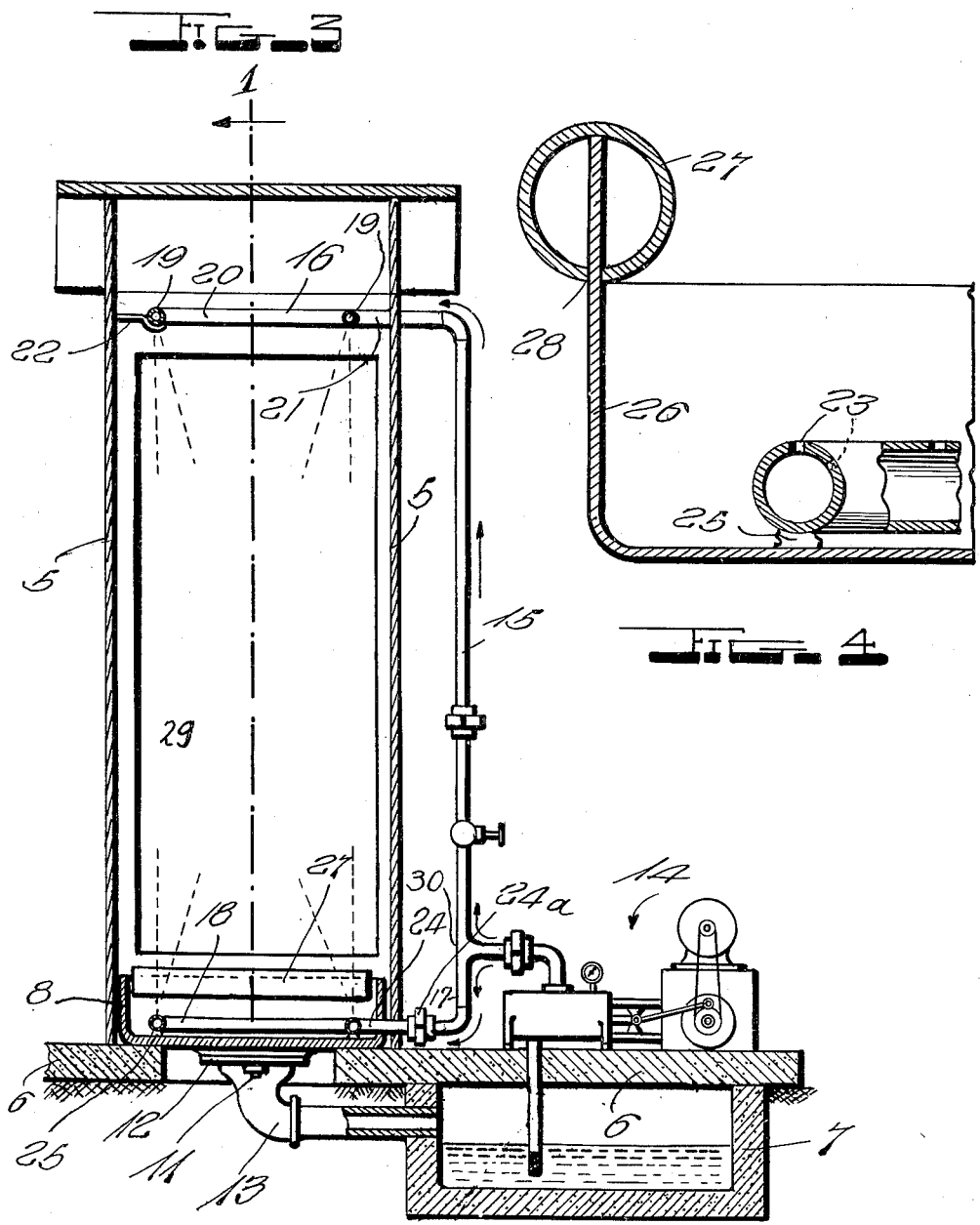
INVENTOR.
James Paul Turner,
by Frank S. Appleman,
ATTORNEY Patented Feb. 28, 1950

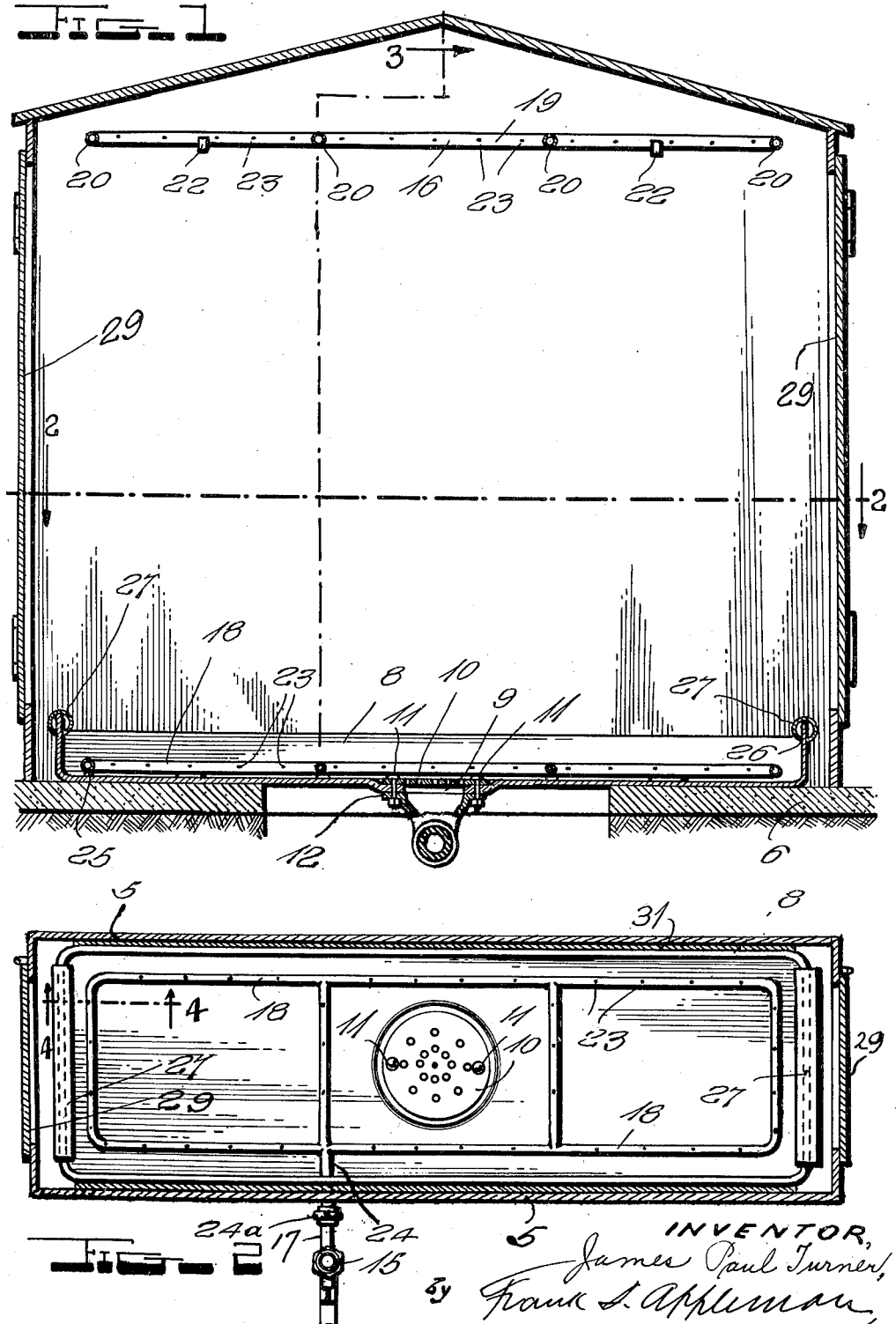

2,499,174

UNITED STATES PATENT OFFICE 2,499,174

CATTLE TREATING APPARATUS

James Paul Turner, Sylvester, Tex.

Application September 30, 1944, Serial No. 556,570

1 Claim. (Cl. 119—159)

This invention relates to apparatus for the treatment of cattle and for subjecting them to a spray for destroying insects or repelling insects, flies, or the like, and the device is in the nature of a shower, whereby fluid may be dispersed under and over the cattle in order that they will be thoroughly coated with the fluid and, of course, the fluid may be impregnated with any of the well known insecticides, so that the inventor does not wish to be limited with respect to the fluid or its contents.

An object of this invention is to provide a housing in which an over-head shower is suspended or supported a suitable distance above the animal occupying the housing; and it is furthermore an object to provide a shower in a location beneath the animal occupying the housing, it being understood that the shower may have jets discharging downwardly and laterally, and the lower shower has jets that discharge upwardly and diagonally, so that a wide range of coverage will be effected.

It is furthermore an object to provide a pan in which the fluid is collected and discharged into a pool or reservoir, from which it is drawn for further circulation through the shower.

It is an object of the invention furthermore to provide a pan having a drain opening and a drain guard secured so that it will not be displaced by the animal in entering or leaving the housing; and it is furthermore the purpose of the inventor to provide guards for the edges of a fluid collecting pan so that the animal will not be abraded or injured by contacting the edges of the pan.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a longitudinal sectional view of a housing with elements of the shower installed, taken on the line 1—1 of Fig. 3;

Figure 2 illustrates a horizontal sectional view of the device on the line 2—2 of Fig. 1;

Figure 3 illustrates a sectional view of the device on the line 3—3 of Fig. 1; and Figure 4 illustrates a sectional view on the line 4—4 of Fig. 2.

In these drawings 5 denotes a housing which may be of any appropriate type, the said housing being installed on a base 6 of plastic composition or the like, in connection with which a reservoir or trough 7 is formed for collecting and holding the fluid or solution which is drawn from it and circulated through the shower. Under certain conditions the base 6 may be omitted and the pan and the housing 5 may rest directly on the ground with the elbow and pipe located under the pan.

Within the housing a collecting pan 8 is installed and it has a drain aperture 9 which is covered by a perforated plate 10, which plate is held in place by bolts 11 extending through apertures in the pan and plate, and it is shown that the bolts extend through a flange 12 of a drain pipe 13 which extends into the trough or reservoir 7 so that the fluid which has drained from the animal being treated will find its way to the reservoir and will then be re-circulated through the shower by appropriate means.

In the illustration, a conventional type of motor and pump is shown collectively at 14, but the inventor does not wish to be limited with respect to the manner of circulating the fluid, as it can be accomplished by a hand pump where the installation is to be an inexpensive assembly of the type.

The pump is shown as having a circulating pipe 15 leading to the upper shower 16 and a circulating pipe 17 connected to the lower shower 18. The circulating pipes are connected to the pump through a T 30.

The upper shower comprises longitudinally and transversely disposed pipes 19 and 20, respectively, with a branch pipe 21 connected to them. The pipe 15 from the pump is appropriately connected to the branch pipe 21 and the upper shower is held in place or supported by brackets, such as 22, anchored to the wall of the housing and by the branch pipe 21 which extends through the housing on the side of the shower opposite the brackets.

The pipes of the upper shower have holes or ducts 23 which are inclined downwardly at an angle, and they have other ducts of similar character which discharge vertically, so that the spray occasioned by the discharge of the fluid from the ducts approximates the shape illustrated by the dotted lines in Fig. 3, wherefrom it can be visualized that the animal occupying the housing will be quite thoroughly covered by the fluid.

The lower shower 18 is shown in plan in Fig. 2 and it comprises longitudinal and transverse pipes having a branch pipe 24 which is connected to the pipe 17 of the pump. Preferably a joint 24a is formed in the branch pipe externally of the housing as a means for facilitating the assembly of parts of the fluid circulating system.

The lower shower is supported on lugs 25 that are either connected to the pipes or the pan, it being desirable that the pipes should be supported above the floor of the pan to permit the fluid to readily escape.

The edges of the ends 26 of the pan have guards 27 applied to them and they are shown as comprising tubular guards having a slot 28 which receives the end of the pan so that the guard will be held thereon, as shown in the enlarged detail view, Fig. 4. Figure 4 furthermore shows to better effect the positioning of the discharge orifices which correspond to those which are indicated as at 23, heretofore mentioned.

The location of the housing 5 with relation to the edge of the pan may be such that these elements are in contact to insure that the water which may contact the inner surfaces of the housing drains into the pan, or any suitable packing 31 may be inserted at the joint between the side of the pan and the housing to effect a similar result. The housing is provided with end doors 29 that are appropriately mounted to be opened and closed although, under some circumstances, the doors may be omitted.

I claim:

In a cattle spraying apparatus having a foundation provided with an opening therein, an enclosure supported by the foundation, pipes within the enclosure supported adjacent the top thereof and having vertical and diagonal ports for discharging vertically and angularly, the improvement comprising a pan stably supported by the foundation and provided with a drain above the opening in the foundation, pipes located within said pan adjacent the base thereof having ports for discharging vertically and angularly, a reservoir, a pipe connected with said drain and in communication with the reservoir, a circulating pipe connected to the pipes within the enclosure, a second circulating pipe connected with the pipes in said pan, pump means drawing from the said reservoir, and a connection between said first and second named circulating pipes and the pump means.

JAMES PAUL TURNER.

REFERENCES CITED

The following references are of record in the file of this patent:

UNITED STATES PATENTS

| Number | Name | Date |
| --- | --- | --- |
| 577,699 | Weaver et al. | Feb. 23, 1897 |
| 870,766 | Eaton | Nov. 12, 1907 |
| 893,820 | Goff | Feb. 7, 1911 |
| 1,273,311 | Barnes | July 23, 1918 |
| 1,803,413 | Trites | May 5, 1931 |
| 1,900,658 | Niedecken | Mar. 7, 1933 |

FOREIGN PATENTS

| Number | Country | Date |
| --- | --- | --- |
| 27,268 of 1930 | Australia | July 16, 1931 |
| 116,202 | Australia | Nov. 24, 1942 |